US009513042B2

(12) United States Patent
Gurin

(10) Patent No.: US 9,513,042 B2
(45) Date of Patent: Dec. 6, 2016

(54) HEAT EXCHANGERLESS HEAT TRANSFER OF IMMISCIBLE FLUIDS

(71) Applicant: Michael Gurin, Glenview, IL (US)

(72) Inventor: Michael Gurin, Glenview, IL (US)

( * ) Notice: Subject to any disclaimer, the term of this patent is extended or adjusted under 35 U.S.C. 154(b) by 255 days.

(21) Appl. No.: 14/479,365

(22) Filed: Sep. 7, 2014

(65) Prior Publication Data

US 2016/0068411 A1 Mar. 10, 2016

(51) Int. Cl.
| | | |
|---|---|---|
| C02F 1/44 | (2006.01) |
| F25B 43/00 | (2006.01) |
| C02F 1/02 | (2006.01) |
| F25B 13/00 | (2006.01) |
| B01D 61/36 | (2006.01) |

(52) U.S. Cl.
CPC .............. *F25B 43/003* (2013.01); *B01D 61/36* (2013.01); *F25B 13/00* (2013.01); *C02F 1/447* (2013.01)

(58) Field of Classification Search
CPC ........... C02F 1/44; C02F 1/02; C02F 2103/08; C02F 1/447; F25B 13/00; F25B 43/003; B01D 61/36
USPC ........................ 62/238.7, 101, 497; 210/175
See application file for complete search history.

(56) References Cited

U.S. PATENT DOCUMENTS

| | | | |
|---|---|---|---|
| 4,681,605 A * | 7/1987 | Gollan | B01D 67/0009 210/500.28 |
| 4,806,244 A * | 2/1989 | Guilhem | B01D 61/025 210/638 |
| 5,127,234 A * | 7/1992 | Woods, Jr. | F25B 15/02 62/101 |
| 5,256,296 A * | 10/1993 | Baker | B01D 53/226 210/321.6 |
| 5,873,260 A * | 2/1999 | Linhardt | B01D 61/362 62/101 |
| 7,892,321 B2 * | 2/2011 | Aagesen | B01D 61/362 210/640 |
| 9,283,522 B2 * | 3/2016 | Meuleman | B01D 61/362 |
| 2010/0072135 A1 * | 3/2010 | Hanemaaijer | B01D 1/0035 210/640 |
| 2012/0067820 A1 * | 3/2012 | Henthorne | B01D 61/02 210/641 |
| 2012/0234753 A1 * | 9/2012 | Flettner | C02F 3/348 210/615 |
| 2013/0015052 A1 * | 1/2013 | Vane | B01D 1/28 203/16 |

* cited by examiner

*Primary Examiner* — Mohammad M Ali

(57) ABSTRACT

The heat exchangerless membrane system optimizes heat transfer between a set of two immiscible fluids such that the second of the two immiscible fluids having an additive, notably an additive that makes the second fluid corrosive, is infrequently in contact any heat exchangers that would make the heat exchanger subject to corrosion. This membrane system is capable of separating the two immiscible fluids downstream of the heat transfer process, such that heat transfer can repeat the cycle again in an energy efficient manner.

20 Claims, 18 Drawing Sheets

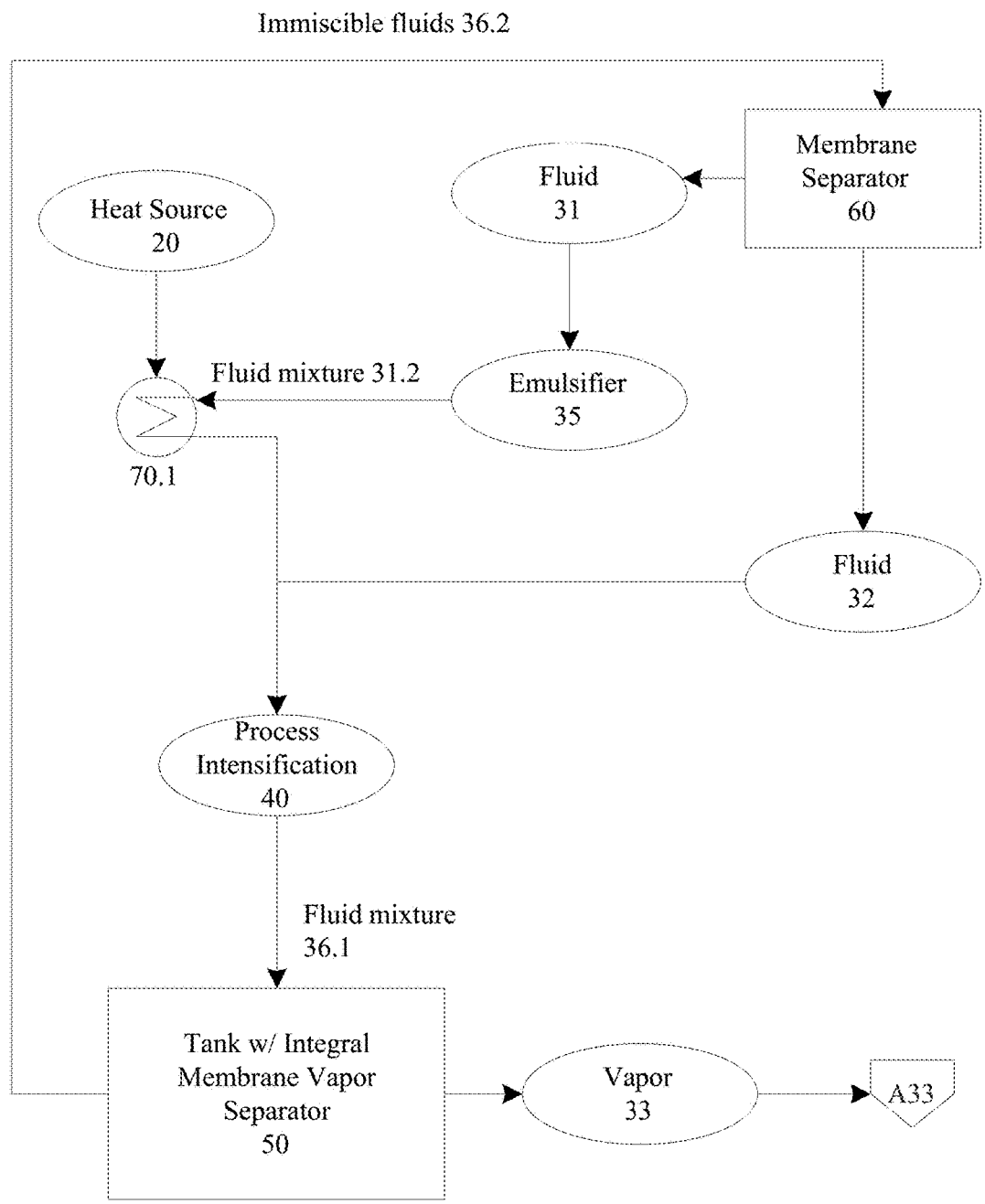

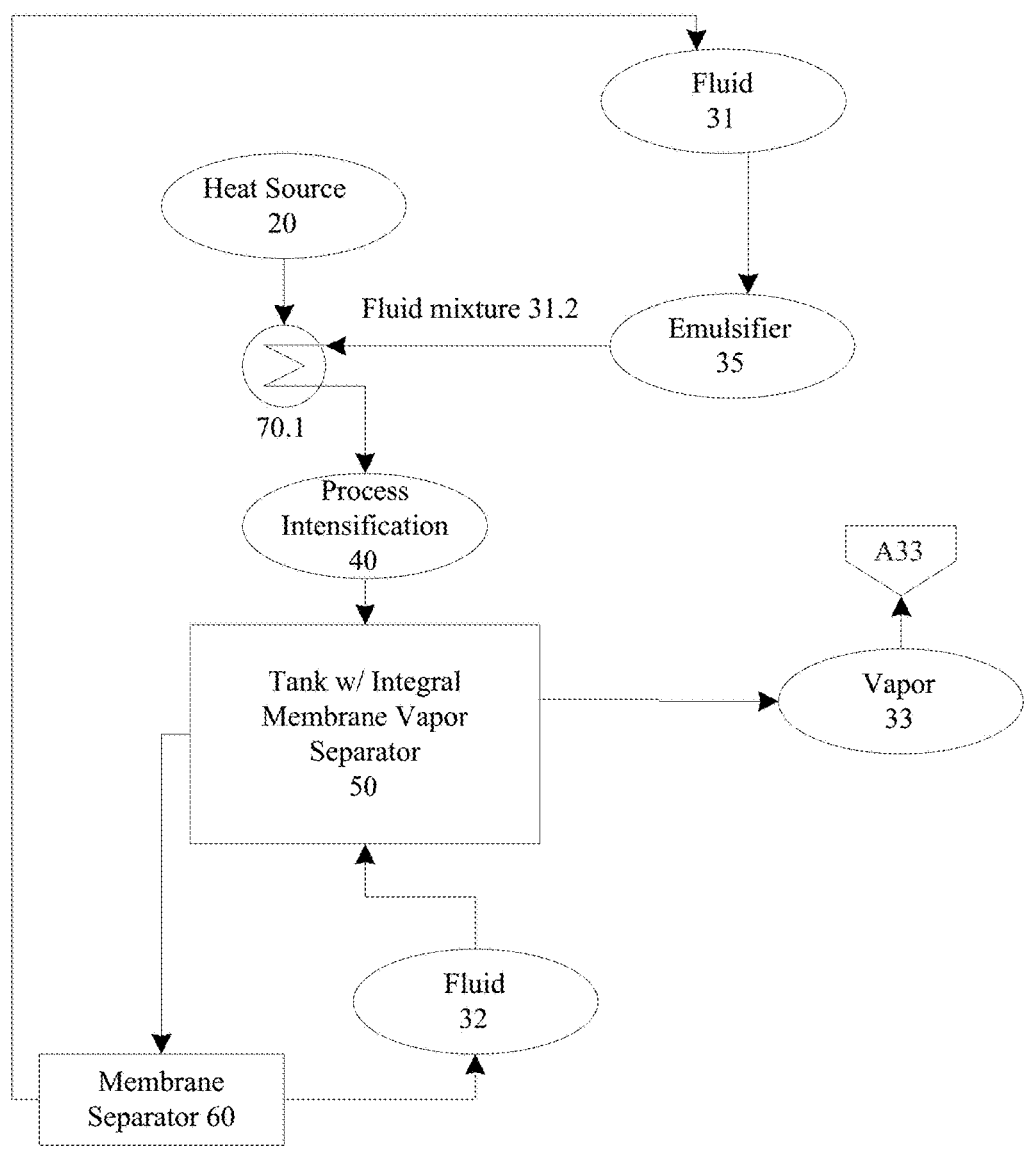
Fig. 2 Counter-current Heat Transfer

Counter-current
Heat Out Transfer

Co-current
Heat Out Transfer

Co-current Heat In Transfer

Counter-current Heat In Transfer

Desalination Applications

Desalination Applications with Energy Recovery

HEAT EXCHANGERLESS HEAT TRANSFER OF IMMISCIBLE FLUIDS

FIELD OF THE INVENTION

The present invention generally relates to heat transfer between two fluids such that a first fluid is immiscible with a second fluid that contains adverse fluid additives (either naturally occurring or specifically added, which are undesirable such as salts or other impurities) that are corrosive or long-term incompatible with heat exchanger materials as known in the art. The range of applications include desalination, absorption chiller, liquid desiccant dehumidification, chemical concentration (i.e., making a strong-solution from an otherwise weak/dilute solution), dehydration, and power generation. The utilization of brackish, seawater, or otherwise salty water is typical in such applications that require heat transfer (i.e., addition or removal of thermal energy) typically done through heat exchangers. The long-term exposure of heat exchangers to such additives, which are typically made of metals to enhance heat transfer, require either more expensive metals (e.g., titanium, stainless steel, etc.) or selection of materials with a significantly inferior thermal conductivity in order to reduce susceptibility to corrosion.

BACKGROUND OF THE INVENTION

This invention addresses heat transfer predominantly for the purpose of vaporizing a constituent of a working fluid. Historically, heat transfer is done through heat exchangers comprised of substrate materials to resist corrosion, scaling, or fouling due to the working fluid by "adverse additives" within the working fluid such as salts, acids, or bases. This traditional method utilizes traditional heat exchangers to promote such heat transfer. In the past, the utilization of an immiscible fluid void of adverse additives plus the working fluid was not taken into consideration for heat transfer as a method of eliminating (or reducing) the exposure of a heat exchanger to the additives in which long-term performance would be severely challenged.

One such prior art is US 2011/0056655, being a dual-fluid heat exchanger, with the purpose of removing heat from a surface that contacts only a first fluid. The first and second fluids are immiscible, but are utilized solely for the purpose of increasing effective heat capacity and efficiency.

Another prior art is U.S. Pat. No. 4,512,332, being a solar pond where two immiscible fluids are used such that the objective is for the lower density fluid to contain the higher density fluid and ultimately to increase the overall solar conversion efficiency. The two fluids are selected with system design to minimize the interaction of the two fluids within the active area of heat transfer.

Yet another prior art is U.S. Pat. No. 4,063,419 that is another solar pond configuration. The use of a film or membrane is solely for the purpose of inhibiting one of the immiscible fluids from evaporation within the solar pond. The separation of the two immiscible fluids requires the use of a settler. A more fundamental difference is that evaporation of one of the fluids, by flash drum evaporation, takes place after the two immiscible fluids are phase separated.

Another prior art is U.S. Pat. No. 4,370,860, being a device to use brine for generating power. An immiscible fluid is vaporized through the brine (i.e., a corrosive fluid), and separation takes place by evaporation and "lifting". The operating fluid, which is the vaporized fluid, has a latent heat flux much larger than the latent heat flux of the working fluid.

Another prior art, U.S. Pat. No. 6,119,458, is another heat exchanger method that utilizes two immiscible fluids to enhance heat transfer, but dependent on a free floating media bed to achieve "intimate" mixing. '458 is void of any surfactants by design as it requires separation of the two immiscible fluids subsequent to the heat transfer within the active area. '458 does not speak to any subsequent method of separating the two immiscible fluids, thus is further absent of any hydrophobic, super-hydrophobic, and/or superomniphobic membranes. Reference to prior art addresses the requirement of demisting equipment as a method of reducing fluid carryover when a first immiscible fluid vaporizes and thus separates from a second fluid. The two fluids are specifically selected to have differing densities for relative motion to each other.

Another prior art is U.S. Pat. No. 4,167,099, being another countercurrent heat exchange system. This use of two immiscible fluids has one fluid vaporize and thus separate from the other fluid all within a settler where the hot fluid rises. In this instance, the two fluids are intimately mixed and passed into a settler wherein the brine settles to the bottom of the settler and the hot working fluid rises to the top.

In none of the prior art methods is there any mention of specific heat capacity—relative ratios between the two fluids such that a first immiscible fluid has a temperature greater than a second immiscible fluid. The heat transfer between the two fluids with their corresponding specific heat capacity is such that the second immiscible fluid vaporizes as a result of heat transfer between the two fluids.

In none of the prior art methods is there any mention of heat of salt dissolution. Most salt solutions, notably seawater, have an endothermic heat of dissolution. The ability to recover thermal energy sufficient to provide the heat of salt dissolution requires thermal recovery from the vapor-side of the membrane to a non-phase change fluid and preferably into a second fluid such that reasonably close matching thermal flows are required between the two immiscible fluids.

None of the prior art methods have a higher membrane back-pressure above 0.5 atmospheres, where such a greater mass flow would be achieved on the vapor-side (as compared to the much lower density of a partial vacuum) of the membrane, which would require the inclusion of a super-hydrophobic membrane.

SUMMARY OF THE INVENTION

The present invention preferred embodiment relates to direct heat transfer between two immiscible fluids, such that a second working fluid having adverse additives that tend to corrode, foul, and/or scale substrates/surfaces within heat exchangers achieve their heat transfer solely or predominantly from the first immiscible fluid.

Another embodiment of the invention is the separation of the two immiscible fluids from each other through the use of omniphobic or hydrophilic and oleophobic membranes under gravity separation conditions (i.e., minimal pressure differentials across the membrane) following heat transfer into/from the second working fluid.

Yet another embodiment of the invention is the displacement/removal of adverse additive that precipitates out of the second working fluid, which is accomplished by the first working fluid (and any subsequent filtration process) to isolate the adverse additives prior to the first working fluid having (or at least minimizing) exposure to a heat exchanger.

Another embodiment of the invention is to more closely match, within less than twenty five percent of the first working fluid, specific heat capacity between the first working fluid and the second working fluid in its vapor state, so as to maximize the recovery of thermal energy from the vapor back into pre-heating the first working fluid.

BRIEF DESCRIPTION OF THE DRAWINGS

FIG. 1 is a diagram depicting a heat exchangerless system in a co-current heat transfer configuration with one of the working fluids changing phase to a vapor.

FIG. 2 is a diagram depicting a heat exchangerless system in a counter-current heat transfer configuration with one of the working fluids changing phase to a vapor.

DETAILED DESCRIPTION OF THE INVENTION

Figure 3A:
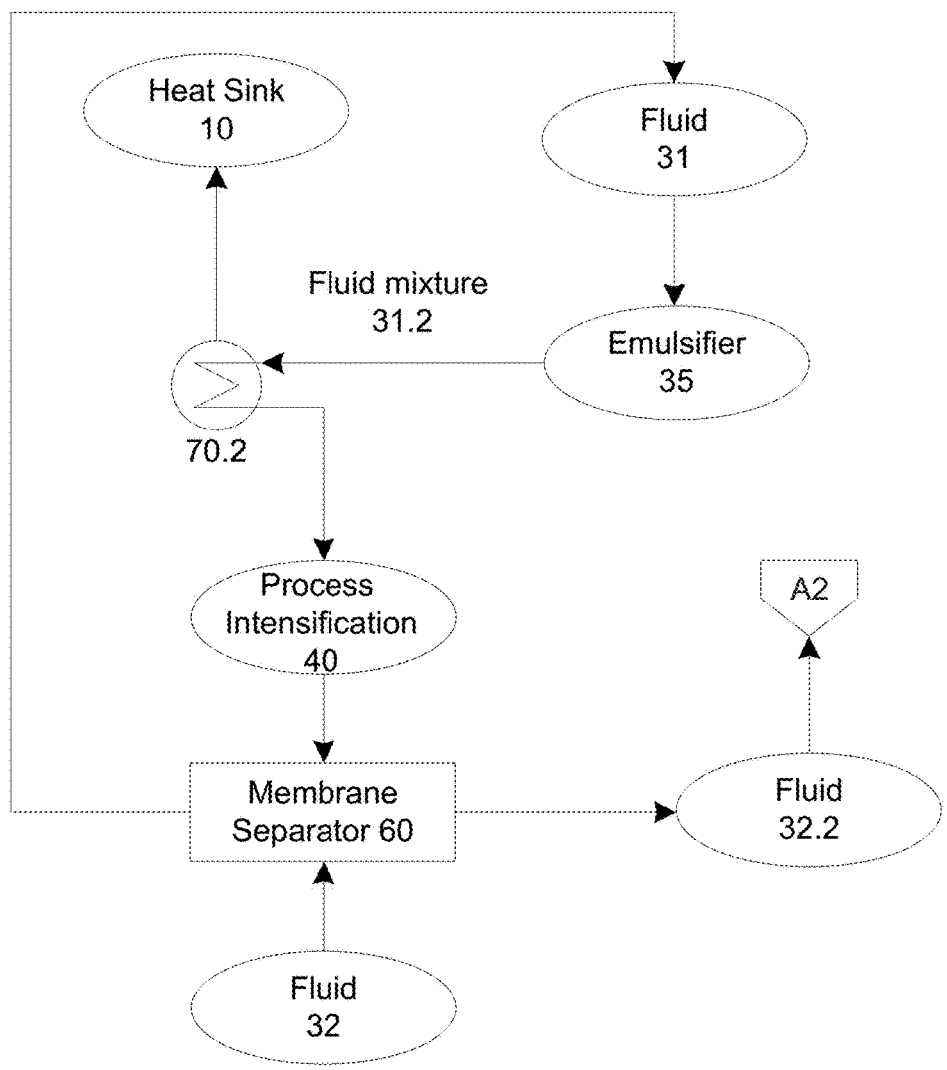
FIG. 3a is a diagram depicting a heat exchangerless system in a counter-current heat transfer configurations (cooling) with neither one of the working fluids changing phase.

The term "heat exchangerless heat transfer," as used herein, includes any heat transfer configuration such that adding or removing thermal energy takes place first within a first fluid (that can be via a heat exchanger) that is immiscible with a second fluid that has adverse additives, and such that the first fluid transfers thermal energy into/out of the second fluid such that the adverse additives do not come into contact with the heat exchanger utilized for initial heat transfer into/out of the first fluid.

The term "traditional heat exchanger" includes heat transferring devices as known in the art, including but not exclusively serpentine coils, microchannel coils, plate and frame, or shell and tube, wherein both fluids come into contact with the heat exchanger material.

The term "phase-change," as used herein, includes any type of transformation from a liquid to a vapor, whether the vapor is saturated (i.e., wet), superheated (i.e., dry), or supercritical (i.e., a gas).

The term "co-current," used interchangeably with the term "co-flow," is a process by which two fluids mix or transfer heat while traveling in the same direction within a heat exchanger or mixing tank, as known in the art. The term "tank" is interchangeably used as mixing vessel, mixing system, etc. but in general a vessel (or a system) in which the first fluid mixes with the second fluid for the purpose of heat transfer directly between the first fluid and second fluid (which most often includes additives such as salt, acids/bases, etc. Any actual heat exchanger is capable/operable to transfer thermal energy into or out of the first fluid upstream of a heat exchangerless tank by direct contact of the immiscible fluids (e.g., first fluid and second fluid)

The term "counter-current," used interchangeably with the term "counter-flow," is a process by which two fluids mix or transfer heat while traveling in the opposite directions within a heat exchanger or mixing tank, as known in the art.

The term "superhydrophobic," as used herein, includes surfaces that display contact angles θ greater than 150°, along with a low contact angle hysteresis (the difference between the advancing and the receding contact angles) for water. Water droplets can easily roll-off from and bounce on such surfaces. Known superhydrophobic surfaces are textured (or rough), as the maximum water contact angle θ measured to date on a smooth surface is believed to be only about 130°. Superhydrophobic surfaces are pervasive in nature with various plant leaves, legs of the water strider, gecko's feet, troughs on the elytra of desert beetles, and insect wings displaying extreme water-repellency. Some synthetic or artificial engineered superhydrophobic surfaces have also been developed. These superhydrophobic surfaces tend to be quite difficult to reliably create, require complex processing and customized materials, and therefore have been quite expensive.

The term "superoleophobic," as used herein, includes surfaces that repel low surface tension liquids such as different oils. Furthermore, most superoleophobic surfaces are also superhydrophobic, because surfaces that can repel low surface tension liquids (such as oils and alcohols) can much more easily repel water, which possesses a higher surface tension. However, there are a few superoleophobic surfaces that are wetted by polar liquids such as water and alcohols, such as many of the membranes considered here. In view of such counter-intuitive surfaces, surfaces that can display both superhydrophobicity and superoleophobicity are called "omniphobic" surfaces. Similarly, an ability to create surfaces that exhibit other extreme wetting abilities, such as surfaces that are both superhydrophilic (e.g., displaying contact angles θ of less than 5° for water) and superoleophobic or superhydrophobic and superoleophilic (e.g., displaying contact angles θ of less than 5° for oil) would also be highly desirable. There remains a need for improved, streamlined, cost-effective processes for forming surfaces having such extreme wetting abilities that can be used in a vast array of different technological fields and applications.

The term "emulsifier," used interchangeably with the term "surfactant," is a compound that stabilizes an emulsion of two immiscible fluids, such as oil and water. Other exemplary immiscible fluids include glycerol and water, and ethyleneglycol and water.

The term "hydrophilic" describes a molecule or compound that is attracted to, and tends to be dissolved by, water. A hydrophilic surface on the other hand refers to surfaces that display contact angles with water θ<90°.

The term "lipophilic" describes the ability of a chemical compound to dissolve in fats, oils, lipids, non-polar solvents, etc.

The term "hydrophilic-lipophilic balance," abbreviated as "HLB," of a surfactant is a measure of the degree to which it is hydrophilic or lipophilic. Emulsifiers are classified on a HLB scale from 0 to 20. An HLB of zero, which won't be used, is oil loving (i.e., hydrophobic). Furthermore, it is preferred that an oil in water emulsion is created which, as known in the art, is better suited to an emulsifier with a medium to high HLB (e.g., HLB from 8-12). Emulsifiers with HLB values <10 are lipophilic molecules that are more inclined to solubilize in the oil phase and thus tend to form water-oil emulsions. Emulsifiers with HLB values >10 are hydrophilic emulsifiers; they exhibit a higher water solubility and tend to form oil-water emulsions or are used as solubilizers.

The term "adverse fluid additives" or abbreviated as "adverse additives" are either naturally occurring or specifically added impurities that are undesirable such as salts, sulfur, water or other impurities in the bulk fluid.

Therefore, in this embodiment, our preferred emulsifier will be more soluble in the water phase and thus is more likely to leave the membrane separator 60 with the fluid 32 (water, second fluid). Replenishing emulsifier, though shown downstream of membrane separator 60 with the fluid 31 (oil, first fluid) can also be with the fluid 32 (water). In any event, addition of the emulsifier is preferred to always be upstream of the process intensification 40 device(s). The first fluid has an evaporation temperature (though rarely ever reached as the evaporation temperature is preferred to be significantly above the evaporation temperature of the second fluid. The evaporation temperature of the second fluid is at least 2 degrees Celsius lower than the first fluid's evaporation temperature, preferably at least 10 degrees Celsius, and specifically preferred at least 20 degrees Celsius differential in evaporation temperature between the first and second fluids.

The term "process intensification reactor" is defined as t le miniaturization of chambers in which chemical reactions take place. The utilization of micromixing, particularly with supercritical fluids, achieves high mass transfer and fast reaction times. Supercritical fluids include gases such as carbon dioxide, methane, methanol, ammonia, ethanol, butanol, and hydrogen, The supercritical fluids can be prepared into emulsions, which preferably are nanoemulsions as a means of increasing surface area significantly. Devices include hydrodynamic cavitation devices, rnicrochannei reactors, spinning disk, spinning tube in tube, oscillating flow reactors, and reactive distillation reactors.

The term "superomniphobic," as used herein, refers to super-repellant surfaces that display low contact angle hysteresis promoting easy roll off or bouncing of the contacting liquid droplets (Patent Literature (PL) 1 and 2). To create surfaces exhibiting superomniphobic properties, the surfaces have to display super-repellent features in terms of superhydrophobicity (contact angles >150°, contact angle hysteresis <5° with water) and superoleophobicity (contact angles >150°, contact angle hysteresis <5° with low surface tension, usually $\gamma_{LV}$<30 Nm/m$^2$, with liquids such as oils and alcohols). Surfaces that exhibit contact angles greater than 150° and low contact angle hysteresis for liquids with high or low surface tension energy are said to display extreme repellency. Such super-repellent surfaces fabricated by means of chemical or physical processes are one of the most sought after materials for various automotive, aviation, materials science, biomedical, electronics, corrosion, petrochemical, and other civilian and military applications. Of late, applications have been extended to self-cleaning, non-fouling, spill-resistant fabrics and protective wears, economic consumption of energy through drag reduction and facile heat treatment, fending volcanic dusts and harsh and chemicals. Superomniphobic surfaces are those that display both superhydrophobicity and superoleophobicity (PL 1, NPL 1). The two most common parameters used to measure the extent of liquid repellency are the contact angle and the contact angle hysteresis, which is the difference between advancing and receding contact angles. A surface is considered super-repellent when it exhibits very high contact angles that are greater than 150° and very low contact angle hysteresis that are usually smaller than 5°.

Superomniphobic surfaces display high contact angles that are greater than 150° and a very low contact angle hysteresis that is usually smaller than 5° for virtually all liquids, including low surface tension liquids (PL 1). Surfaces with hierarchical scales of texture (i.e., more than one length scale of texture) display higher contact angles and lower contact angle hysteresis with a contacting liquid by entrapping air at multiple length scales, thereby reducing the solid-liquid contact area.

Surfaces that display a contact angle of greater than or equal to about 90°, optionally greater than or equal to about 95°, optionally greater than or equal to about 100°, optionally greater than or equal to about 105°, optionally greater than or equal to about 110°, optionally greater than or equal to about 115°, optionally greater than or equal to about 120°, optionally greater than or equal to 125°, optionally greater than or equal to about 130°, optionally greater than or equal to about 135°, optionally greater than or equal to about 130°, optionally greater than or equal to about 140°, and in certain aspects, optionally greater than or equal to about 145° with water or other polar liquids, and oils are considered to be "hydrophobic" and "oleophobic", respectively.

Practical applications of hydrophobic, oleophobic, superhydrophobic, and superoleophobic surfaces are diverse, and range from stain-free clothing, spill-resistant protective wear, drag reduction, corrosion resistant coating, and chemical repellent characteristics that possess excellent mechanical, chemical and radiation durability (PL 2). These surfaces display high contact angles and low contact angle hysteresis, induced by surface roughness, hierarchical designs, and re-entrant texture of the surface, for almost all liquids, including low surface tension liquids. The basic parameter for wetting of a liquid on a smooth (non-textured) surface is the equilibrium contact angle θ, postulated from the Young's relation $\cos \theta = \gamma^{SV} - \gamma_{SL}/\gamma_{LV}$, wherein γ is the interfacial tension and S, L and V are the solid, liquid and vapor phases, respectively (PL 1, NPL 1). For interaction of a liquid droplet with a textured (including hierarchical designs) substrate, one of two configurations to minimize the droplets overall free energy can be adopted—the Wenzel sate and the Cassie-Baxter state. The Wenzel state is energetically favorable, while the Cassie-Baxter state can only be metastable, for low surface tension liquids. The rational design of superomniphobic surfaces requires making the metastable Cassie-Baxter state as robust as possible.

Figure 17:
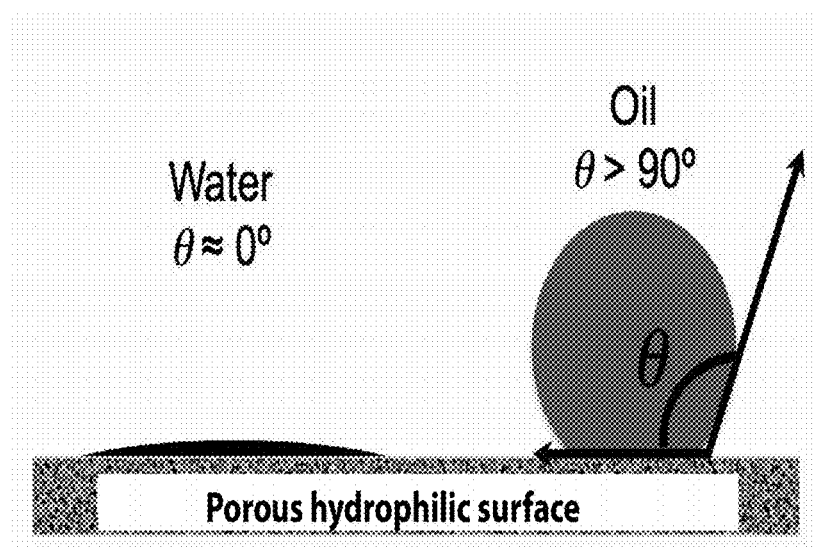
FIG. 17 is a diagram depicting porous hydrophilic surface.

Turning to FIG. 17, FIG. 17 depicts the preferred membrane which is a porous membrane having a porous substrate that has a surface coating making it both superhydrophilic, having a first apparent advancing dynamic contact angle of less than or equal to about 5° for second fluid and oleophobic having a second apparent advancing dynamic contact angle of greater than or equal to about 90° for a preselected first fluid. The porous membrane separates the first fluid from the second fluid downstream of the heat exchangerless tank. The first fluid is at least partially immiscible with the second fluid. The addition of an emulsifier creates an emulsion of first fluid and second fluid (thus eliminating the utilization of a media bed, which is known in the art to increase surface area of each fluid with relationship to each other) to increase the heat transfer rate by a minimum of 10%, preferably above 20%, and specifically preferred greater than 30% beyond the heat transfer rate without the surface area increase attainable by the emulsifier. The membrane must avoid fouling by the first fluid by less than 5%, preferably less than 50%, and specifically preferred less than 90%. Eliminating a mixer-settler system downstream of the heat exchangerless tank enables faster throughput time while still separating the first fluid from the second fluid (which are immiscible with each other).

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. With regard to FIGS. 1 through 16, like reference numerals refer to like parts.

Turning to FIG. 1, FIG. 1 is a diagram depicting a heat exchangerless system in a co-current heat transfer configuration with one of the working fluids changing phase to a vapor. Fluid 32 is the second fluid that contains adverse additives, such as brackish or salty water, as described in previous sections. Fluid 31 is the first fluid which is non-corrosive and is immiscible with fluid 32, such as oil as described in previous sections. Following the hydrophilic and oleophobic membrane separator 60 (which is shown in detail in FIG. 11 and using technology described above), fluid 31 is mixed with an emulsifier 35 to become fluid 31.2, then preheated by heat source 20 in heat exchanger 70.1. The purpose of the heat exchanger is to transfer thermal energy into or out of the first fluid 31 upstream of a heat exchangerless tank, the heat exchangerless tank is operable for heat transfer by direct contact of the first fluid 31 and the second fluid 32; whereby the porous membrane is operable to separate the first fluid from the second fluid downstream of the heat exchangerless tank; and wherein the first fluid is at least partially immiscible with the second fluid. Because of the properties of the emulsifier 35 as previously described, fluid 31.2 and 32 can now mix together as fluid 36.1 in a process intensification 40 (as known in the art to increase heat transfer between the immiscible fluids), which completely mixes the fluids as described previously. The heat from preheated fluid 31.2 vaporizes fluid 32 into vapor 33 in the form of pure steam. The tank with integral membrane vapor separator 60, shown in detail in FIG. 10, separates the incoming mixture 36.1 into vapor 33 and fluid 36.2, which is fluid 31.2 plus any additional non-vaporized fluid 32. Vapor 33 can be used in any applicable process A33. Fluid 36.2 returns to the membrane separator 60 to separate any fluid 31 and remaining fluid 32.

Turning to FIG. 2, FIG. 2 is identical to FIG. 1 except fluid 32 mixes completely with preheated fluid 31.2 in the tank 60 in a counter-flow manner before vaporizing into vapor 33.

Turning to FIG. 3a, FIG. 3a is identical to FIG. 2, except neither fluid experiences a phase change, thus eliminating the need for a tank with vapor separator. In addition, fluid 31.2 is precooled in heat exchanger 70.2 by heat sink 10, which then removes heat from fluid 32 within the membrane separator 60. Fluid 32.2 (i.e., precooled fluid 32) can then be used in any applicable process A2.

Figure 3B:
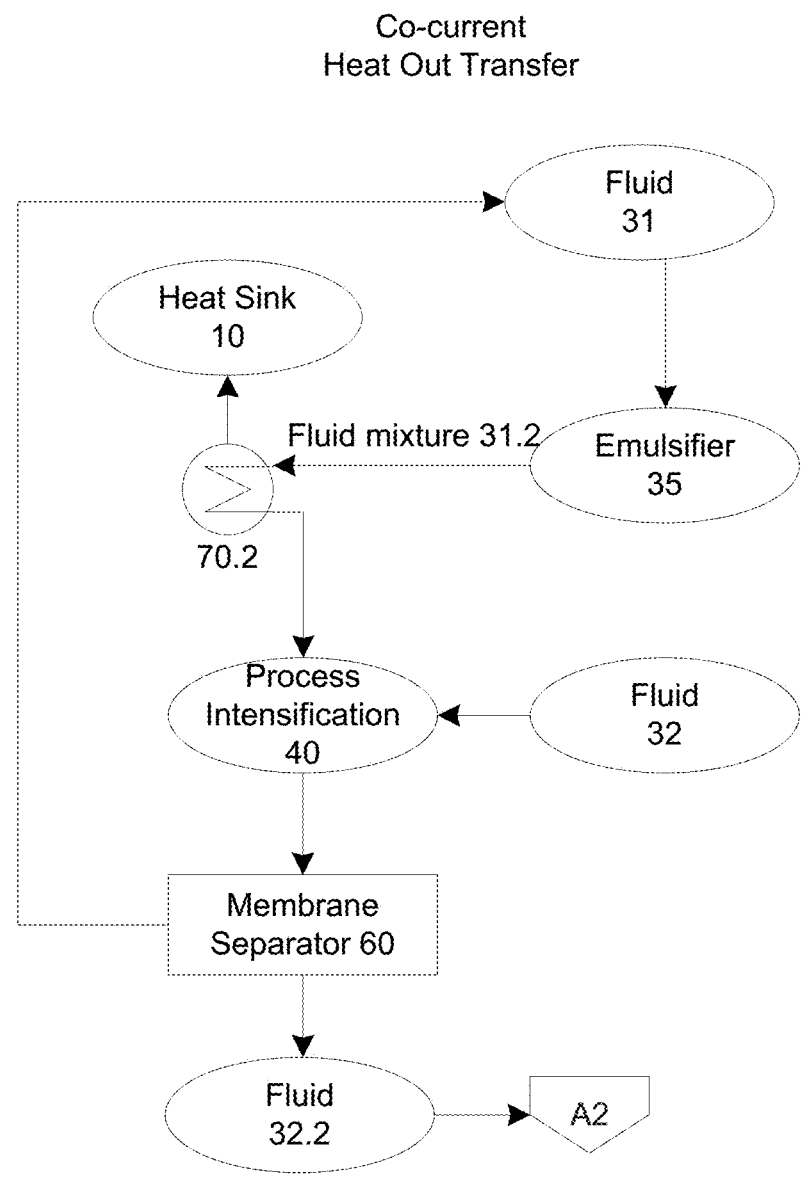
FIG. 3b is a diagram depicting a heat exchangerless system in a counter-current heat transfer configurations (cooling) with neither one of the working fluids changing phase.

Turning to FIG. 3b, FIG. 3b is identical to FIG. 1, except neither fluid experiences a phase change, thus eliminating the need for a tank with vapor separator. Similar to FIG. 3a, fluid 31.2 is precooled in heat exchanger 70.2 by heat sink 10 prior to process intensification 40. The membrane separator 60 separates fluid 32.2, which is fluid 32 that has now been cooled by mixing with fluid 31.2, and fluid 31, which has absorbed the heat from fluid 32. The precooled fluid 32.2 can then be used in any applicable process A2.

Figure 4:
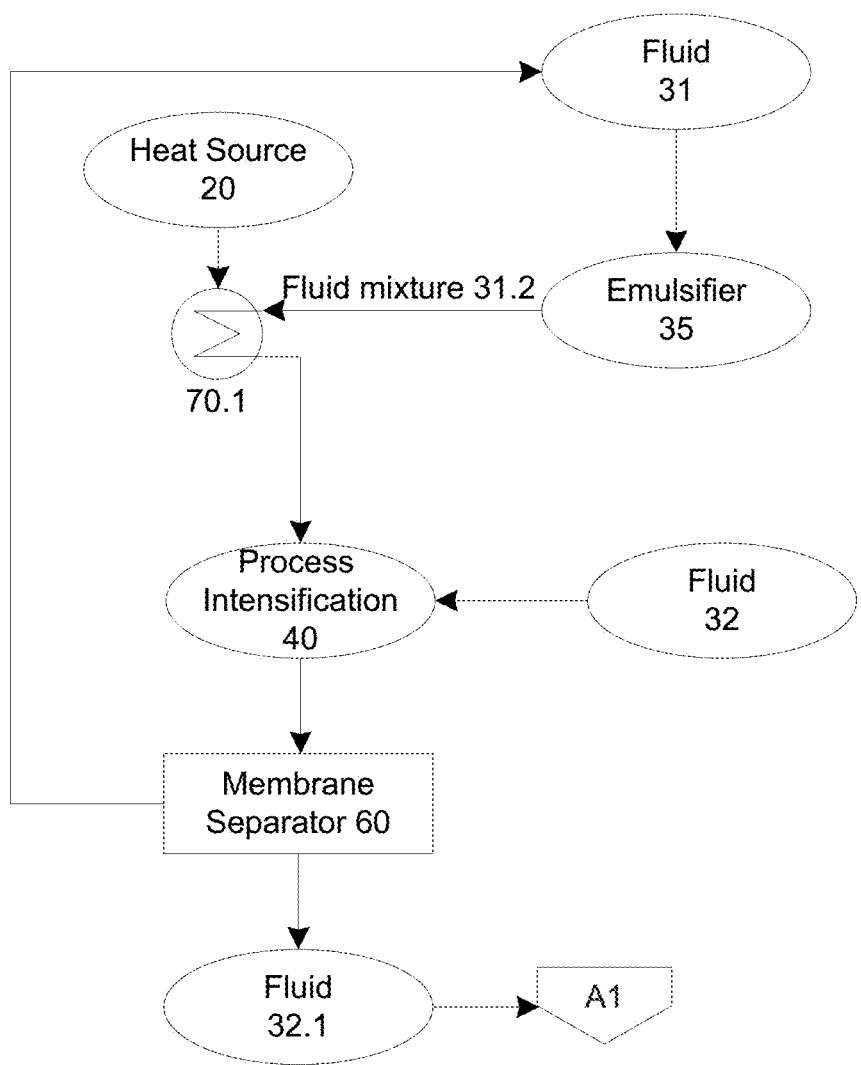
FIG. 4 is a diagram depicting a heat exchangerless system in a co-current heat transfer configurations (heating) with neither one of the working fluids changing phase.

Turning to FIG. 4, FIG. 4 is identical to FIG. 3b except that fluid 31.2 is preheated in heat exchanger 70.2 by heat source 20, thus heating fluid 32 into fluid 32.1 (no phase change) after mixing in process intensification 40, which can then be used in any applicable process A1.

Figure 5:
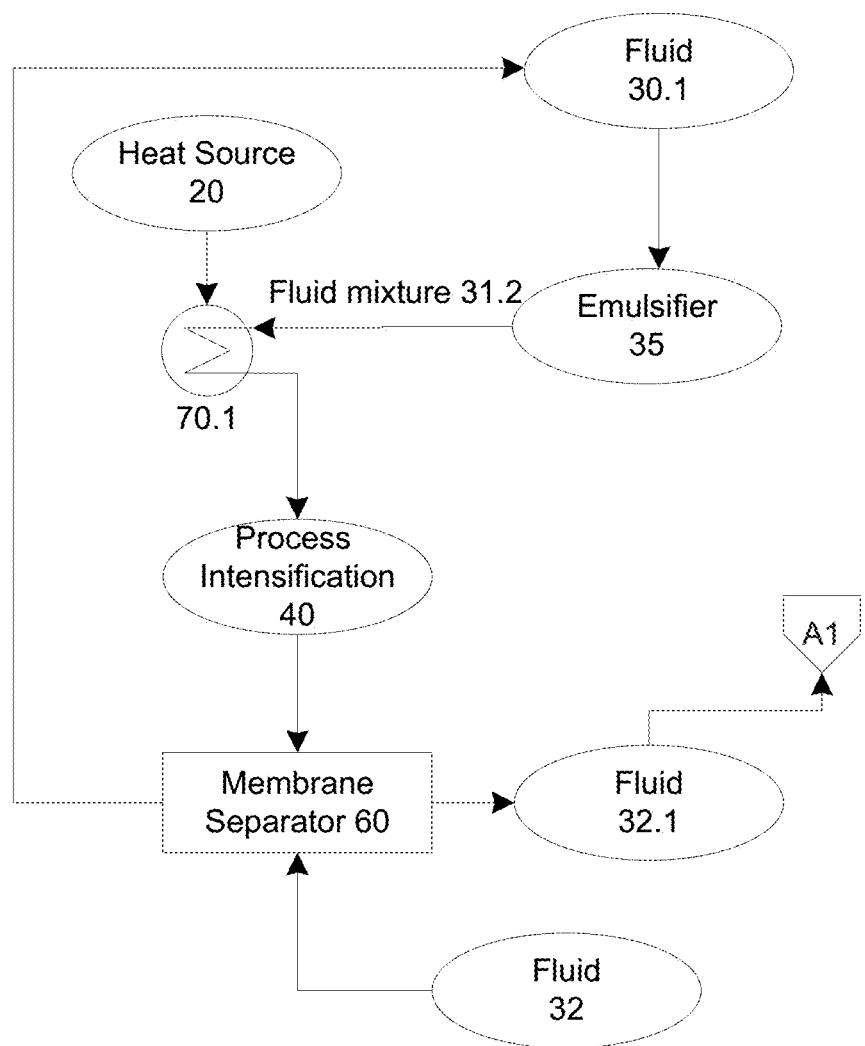
FIG. 5 is a diagram depicting a heat exchangerless system in a counter-current heat transfer configurations (heating) with neither one of the working fluids changing phase.

Turning to FIG. 5, FIG. 5 is identical to FIG. 3a, except that fluid 31.2 is preheated in heat exchanger 70.2 by heat source 20, thus heating fluid 32 into fluid 32.1 in process intensification 40, which can then be used in any applicable process A1.

Figure 6:
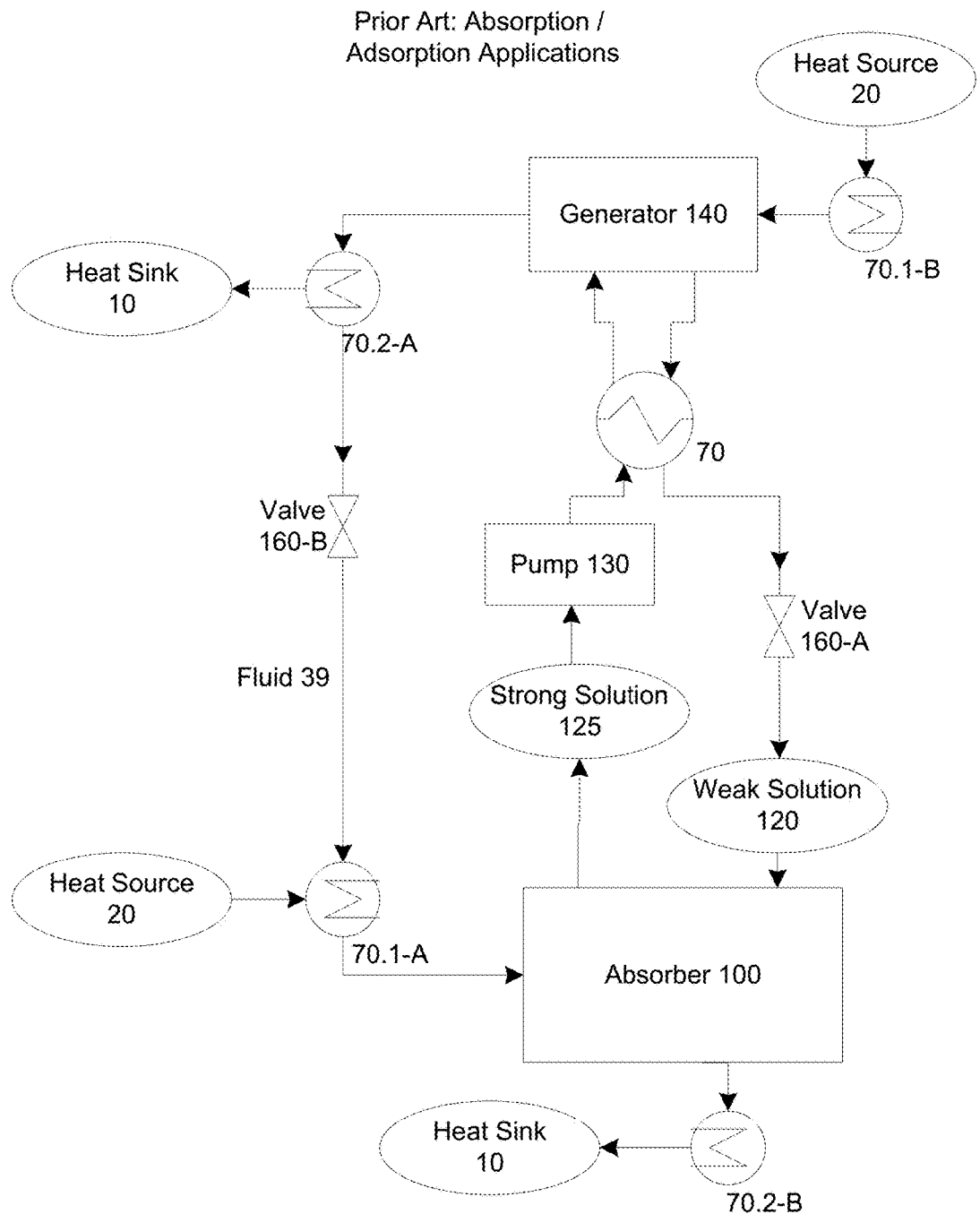
FIG. 6 is a diagram depicting a heat exchangerless system within the absorber section of an absorption/adsorption thermodynamic cycle.

Turning to FIG. 6, FIG. 6 is prior art depicting a traditional absorption refrigeration cycle. This process could also apply to a similarly constructed adsorption cycle as well, as known in the art. The refrigerant, fluid 39 (in this embodiment, ammonia is the preferred refrigerant), rejects heat to the heat sink 10 in heat exchanger 70.2-A, is throttled in the expansion valve 160-B and absorbs heat from heat source 20 in heat exchanger 70.1-A before going into the absorber 100. The fluid 39 is absorbed by the absorbent 120 (i.e., the weak solution, in this embodiment a salt solution as known in the art such as LiBr) and is combined to form the strong solution 125, which is pumped by pump 130 and preheated in the internal heat exchanger 70. The absorber 100 is concurrently cooled by the heat sink 10 in the heat exchanger 70.2-B. The strong solution 125 is heated from the heat exchanger 70.1-B by heat source 20 in the generator 140, which boils out fluid 39. The remaining weak solution 120 preheats the incoming strong solution 125 in the heat exchanger 70 before being throttled by the expansion valve 160-A and returning to the absorber 100.

Figure 7:
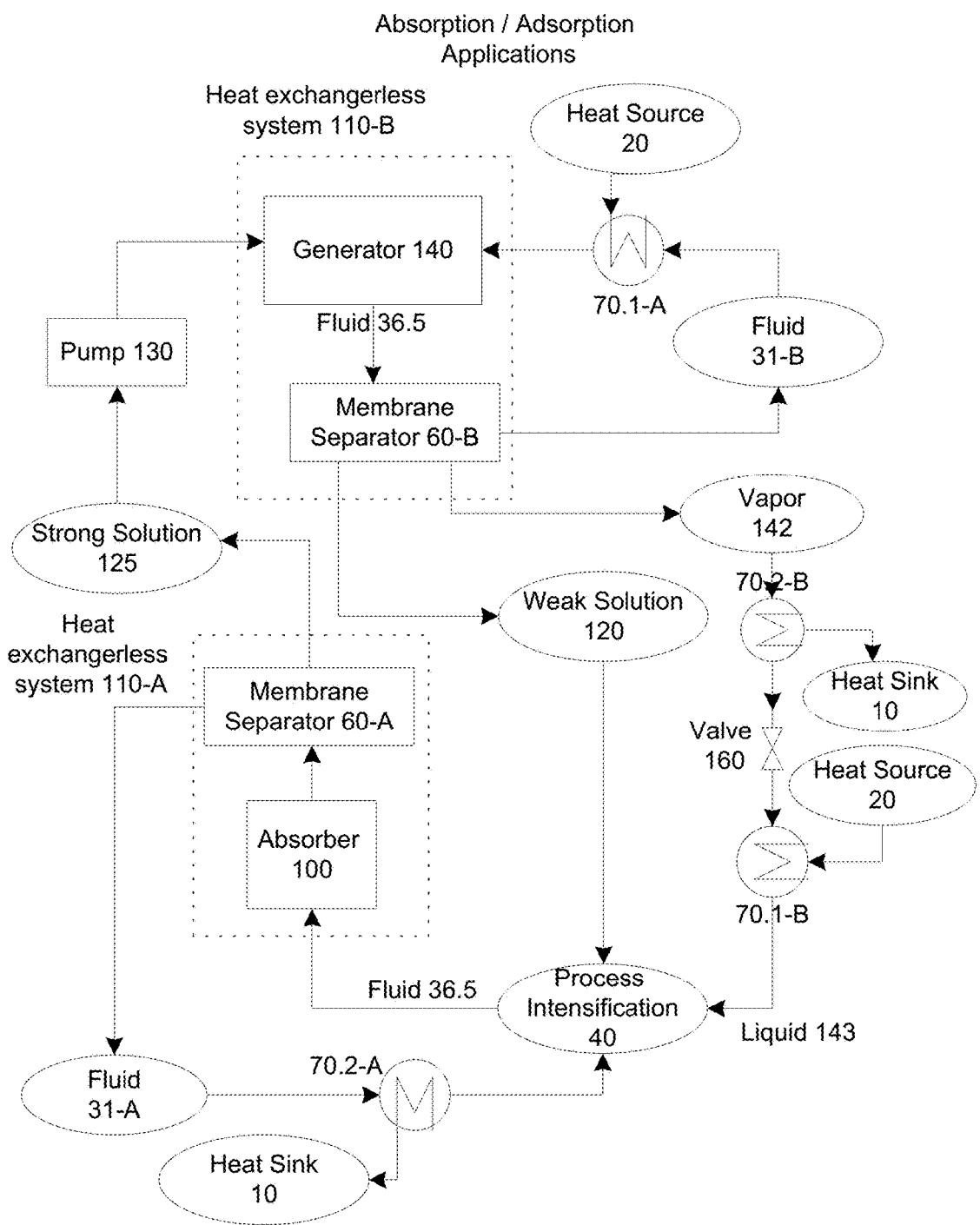
FIG. 7 is a diagram depicting a heat exchangerless system within the generator section of an absorption/adsorption thermodynamic cycle.

Turning to FIG. 7, FIG. 7 depicts an absorption cycle utilizing the hydrophilic and oleophobic membrane separators 60 and heat exchangerless systems 110. This process could also apply to a similarly constructed adsorption cycle as well, as known in the art. In the schematic, the heat exchangerless systems 110-A and B are delineated by the dotted squares encompassing the membrane separator 60 and either the absorber 100 or generator 140. The weak solution 120, which, in this embodiment is comprised of a salt mixed with an amount of ammonia or other refrigerant as known in the art, is mixed with liquid 143, which would be any applicable refrigerant (in this embodiment ammonia is preferred) and mixed with precooled fluid 31-A in a process intensification 40 for intimate mixing and heat transfer within the fluids. The three fluids, combined into fluid 36.5, enter the absorber 100 and into the membrane separator 60-A, where fluid 31-A is removed from the fluid mixture. Within the process intensification 40 and absorber 100, the heat from the mixture of liquid 143 and weak solution 120 is removed by fluid 31-A, which is then re-cooled by heat sink 10 in heat exchanger 70.2-A. The heat exchanger 70.2-A and heat sink 10 could be part of the cooling cycle in a vapor compression heat pump as known in the art. The strong solution 125, made of a mixture of the weak solution 120 and liquid 143, is pumped via pump 130 from the membrane separator 60-A to the generator 140, where it intimately mixes with preheated fluid 31-B. The heat from fluid 31-B vaporizes some of the strong solution into vapor 142 (i.e., high pressure high temperature ammonia). The mixture is separated in the membrane separator 60-B into vapor 142, fluid 31-B, and the remaining weak solution 120. Fluid 31-B is reheated in heat exchanger 70.1-A by heat source 20 before returning to the generator 140. Vapor 142 goes through a partial modified refrigeration cycle and rejects heat to heat sink 10 in heat exchanger 70.2-B, is throttled through expansion valve 160, and then absorbs heat from heat source 20 in heat exchanger 70.1-B before returning to the process intensification 40. After the membrane separator 60-B, the weak solution 120 returns directly to the process intensification 40. There is optional heat recovery (not shown) between the weak solution 120 exiting the membrane separator 60-B and the strong solution 125 exiting membrane separator 60-A to increase the overall system efficiency.

The vapor compression heat pump (refrigerant) or a second fluid vapor recompression provide for heat of compression (or otherwise known as temperature lift). The preferred configuration is where the refrigerant vapor compression heat pump transfers thermal energy into the first fluid void of any phase change. A primary objective of the inventive heat exchangerless membrane system is such that the second fluid, which has at least one additive that makes the second fluid corrosive or acidic/alkaline that would be adverse on a physical heat exchanger. Therefore the inventive system has direct heat transfer into the second fluid preferably only from the first fluid. It is particularly desirable, when the additive is a salt, such that the evaporation of the second fluid takes place by the heat transfer of first fluid. It is optional to have a heat exchanger upstream of this process to preheat the second fluid just lower than the second fluid's evaporation temperature. The preheat point is preferred at least 2 degrees Celsius lower than the first fluid's evaporation temperature and at least 2 degrees Celsius lower than the second fluid's evaporation temperature. Particularly preferred is that the preheat temperature is at least 1 degrees Celsius lower than the second fluid's evaporation temperature and specifically preferred at least 0.1 degrees lower than the second fluid's evaporation temperature. It is known in the art that the evaporation temperature is a function of the corresponding evaporation pressure. Lowering the evaporation temperature is done by lowering the corresponding evaporation pressure including a pressure below 1 atmosphere (i.e., partial vacuum) to lower evaporation temperature to below the "normal" boiling point of the fluid. Regardless of the evaporation pressure, the first fluid is heated by at least 1 degree Celsius above the second fluid's evaporation temperature by any external method as known in the art (e.g., heat of compression of vapor compression heat pump refrigerant, or waste heat recovery from power generation or industrial process) is transferred to the first fluid by a heat exchanger (i.e., void of contact with the at least one additive within the second fluid).

Figure 8:
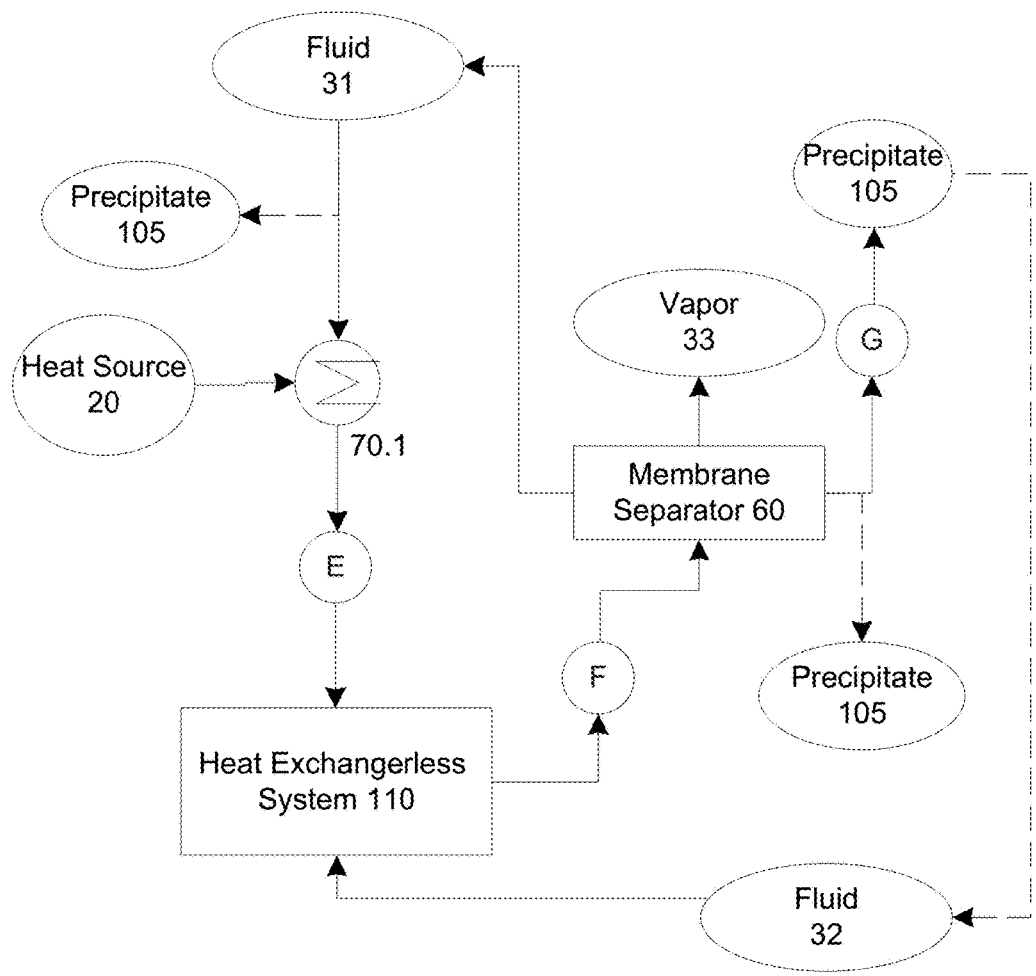
FIG. 8 is a diagram depicting a heat exchangerless system within a desalination application without energy recovery.

Turning to FIG. 8, FIG. 8 depicts a desalination cycle utilizing the membrane separators 60 and heat exchangerless system 110. Fluid 31 is preheated in heat exchanger 70.1 by heat source 20. Fluids 31 and 32 mix within the heat exchangerless system 110 in a process seen in previous drawings, in either a co-current or counter-current flow. The preheated fluid 31 vaporizes fluid 32 into vapor 33. The membrane separator 60 separates fluid 31, vapor 33, and the precipitate 105. The precipitate 105, which will primarily be salt from fluid 31, could be used off-site or returned to the original fluid source. The precipitate 105 could also be removed prior to heat exchanger 70.1 or after the membrane separator 60 prior to any applicable process G. The precipitates can be separated by methods known in the art including filtration, centrifugation, or ultrasonic separation.

Figure 9:
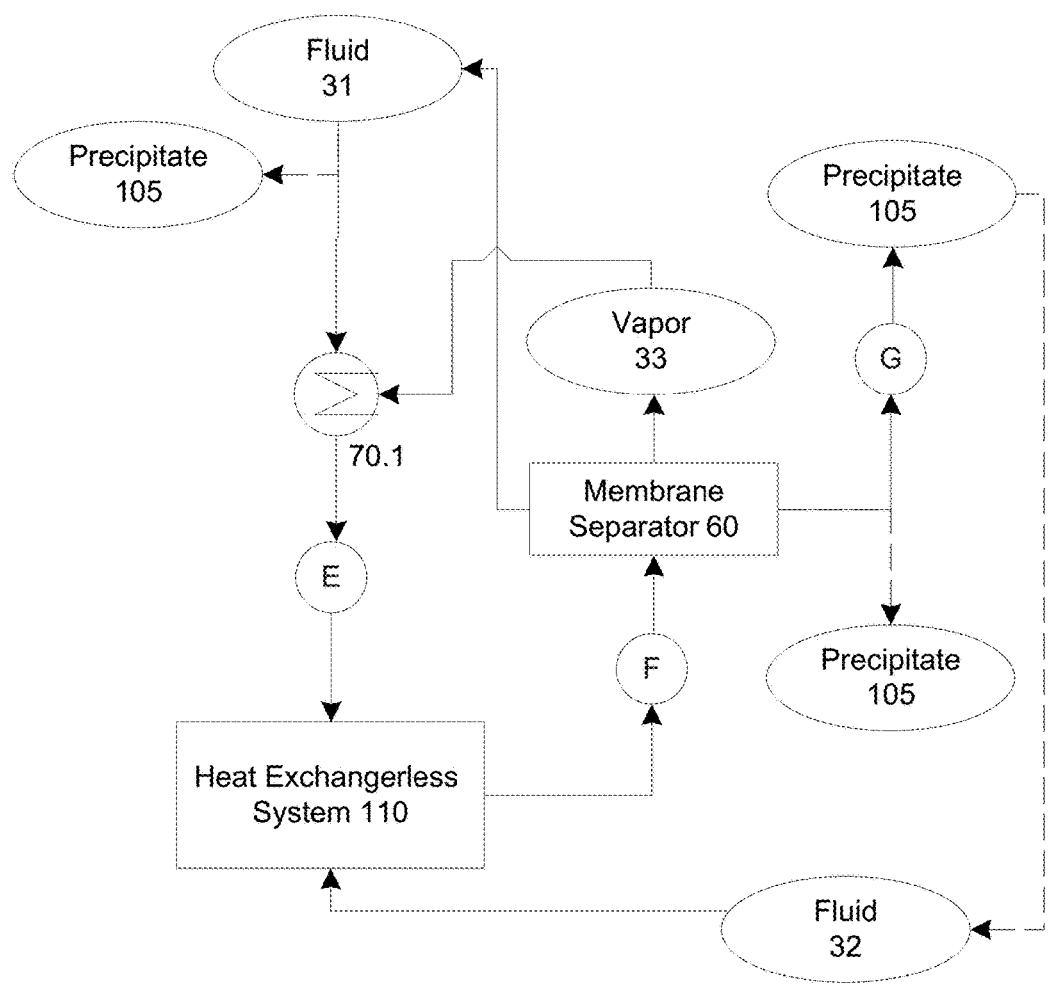
FIG. 9 is a diagram depicting a heat exchangerless system within a desalination application with energy recovery.

Turning to FIG. 9, FIG. 9 is identical to FIG. 8, but with energy recovery to maximize the system efficiency. Vapor 33 is used as the heat source to preheat fluid 31 within heat exchanger 70.1.

Figure 10:
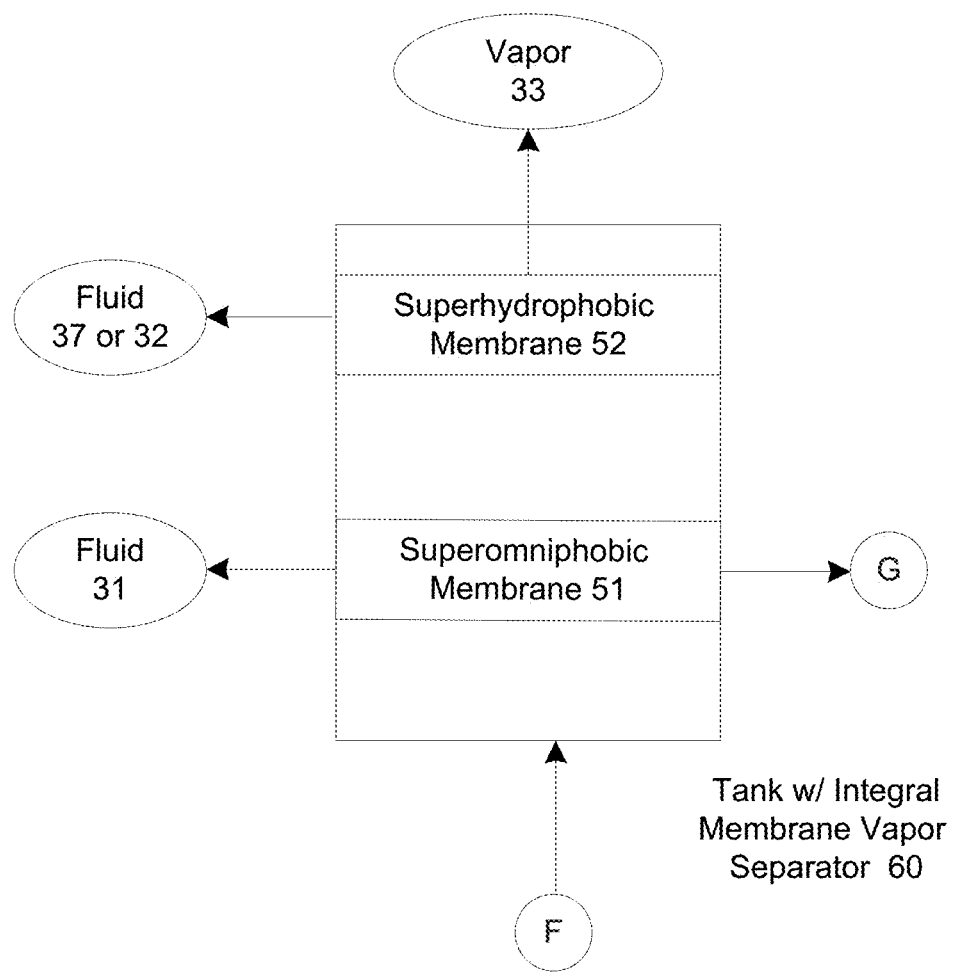
FIG. 10 is a diagram depicting a heat exchangerless system with one exemplary configuration of the membranes.

Turning to FIG. 10, FIG. 10 depicts a heat exchangerless system with one exemplary configuration of the membranes, as shown in other drawings such as FIG. 8, as tank with integral membrane vapor separator 60. The notations of F and G correspond with appropriate locations within previous drawings, such as FIG. 8. A mixture of immiscible fluids, such as fluids 31 and 32 enter the tank at F. The hydrophilic and oleophobic membrane 51 separates out fluid 31 as described in terms above. The superhydrophobic membrane 52 separates out fluid 37 in the form of pure water or fluid 32, depending on the configuration of the system. Assuming heat transfer from fluid 31, vapor 33 exits from the membrane 52. Precipitate 105 or other impurities exit the membrane at G. Previous figures assume that fluid 32 or fluid 37 (depending on configuration) is 100% evaporated into vapor 33, FIG. 10 depicts a scenario assuming fluid 32 or fluid 37 may not be entirely vaporized.

Figure 11:
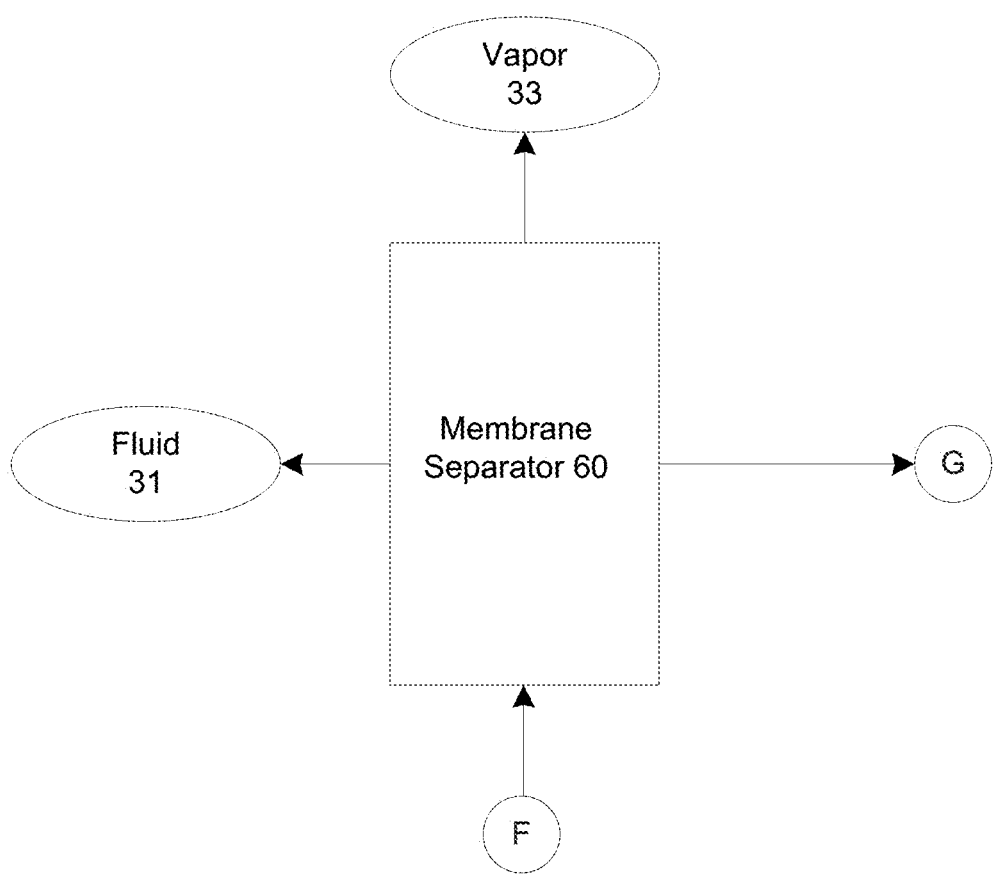
FIG. 11 is a diagram depicting a heat exchangerless system with another exemplary configuration of the membranes.

Turning to FIG. 11, FIG. 11 is a diagram depicting a heat exchangerless system with another exemplary configuration of the membranes. The notations of F and G correspond with appropriate locations within previous drawings, such as FIG. 8. In this embodiment, the membrane separates fluid 31 from vapor 33.

Figure 12:
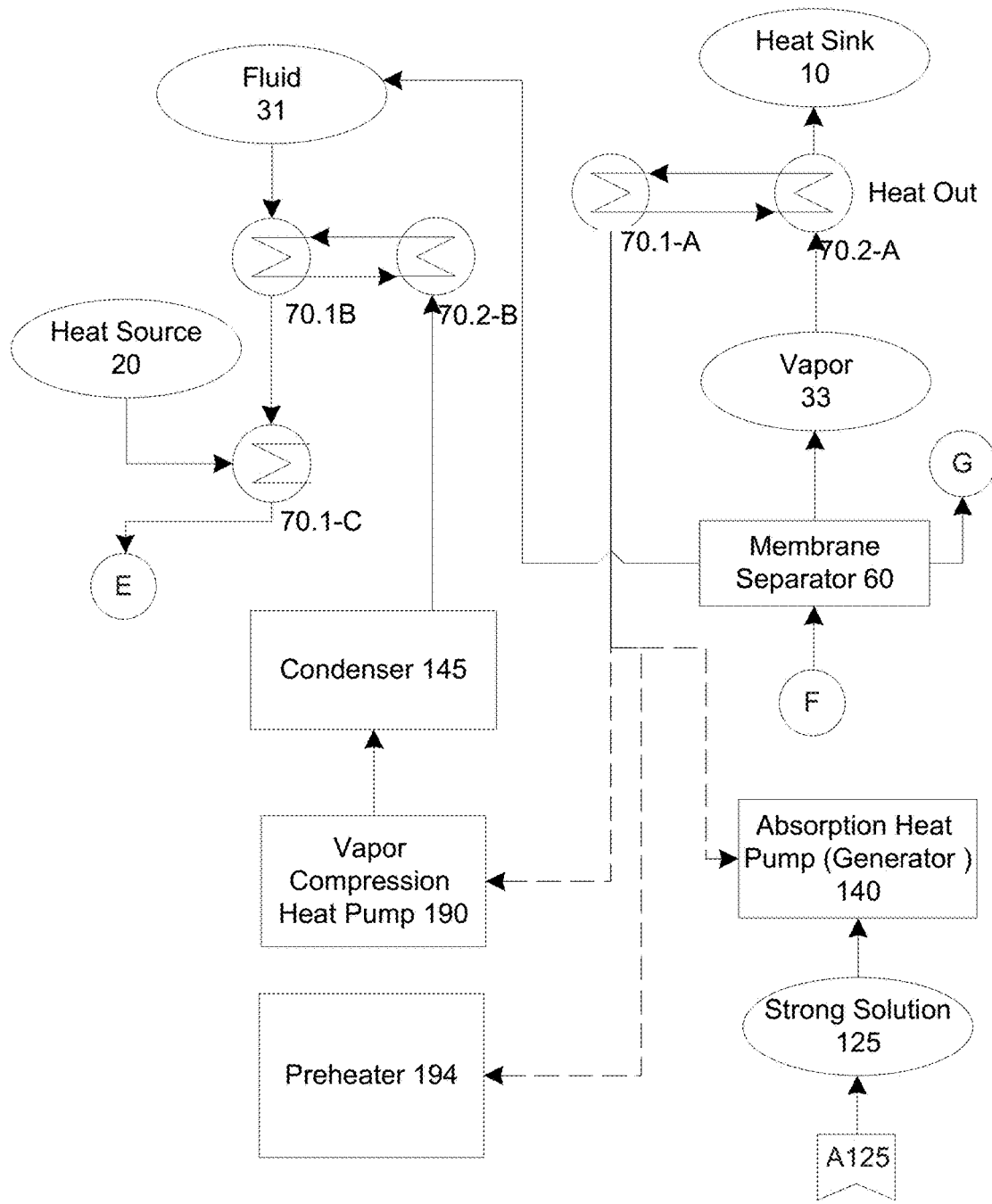
FIG. 12 is a diagram depicting a heat exchangerless system for desalination with integral heat pump energy recovery and another exemplary configuration of the membranes.

Turning to FIG. 12, FIG. 12 is similar to FIG. 9 and depicts a heat exchangerless system for desalination with integral heat pump energy recovery and another exemplary configuration of the membranes. The notations of F and G correspond with appropriate locations within previous drawings, such as FIG. 8. All dotted lines are optional configurations and are not exclude other configurations obvious to those in the art. The membrane separator 60 receives a fluid mixture from F and separates the mixture into fluid 31, vapor 33, and any precipitate or other components in G. The vapor 33 rejects heat into heat sink 10 or heat exchanger 70.2-A, whose heat from heat exchanger 70.1-A can feed a preheater 194, an absorption heat pump 140, as shown in FIG. 6 or 7, or a vapor compression heat pump 190 as known in the art.

If pairing with a vapor compression heat pump 190, the heat gained from heat exchanger 70.1-A could be rejected in condenser 145 and heat exchanger 70.2-B. This heat can be used to preheat fluid 31, along with heat source 20 in another heat exchanger 70.1-C, which can then be used in any appropriate process E as shown in previous drawings such as FIG. 8.

Figure 13:
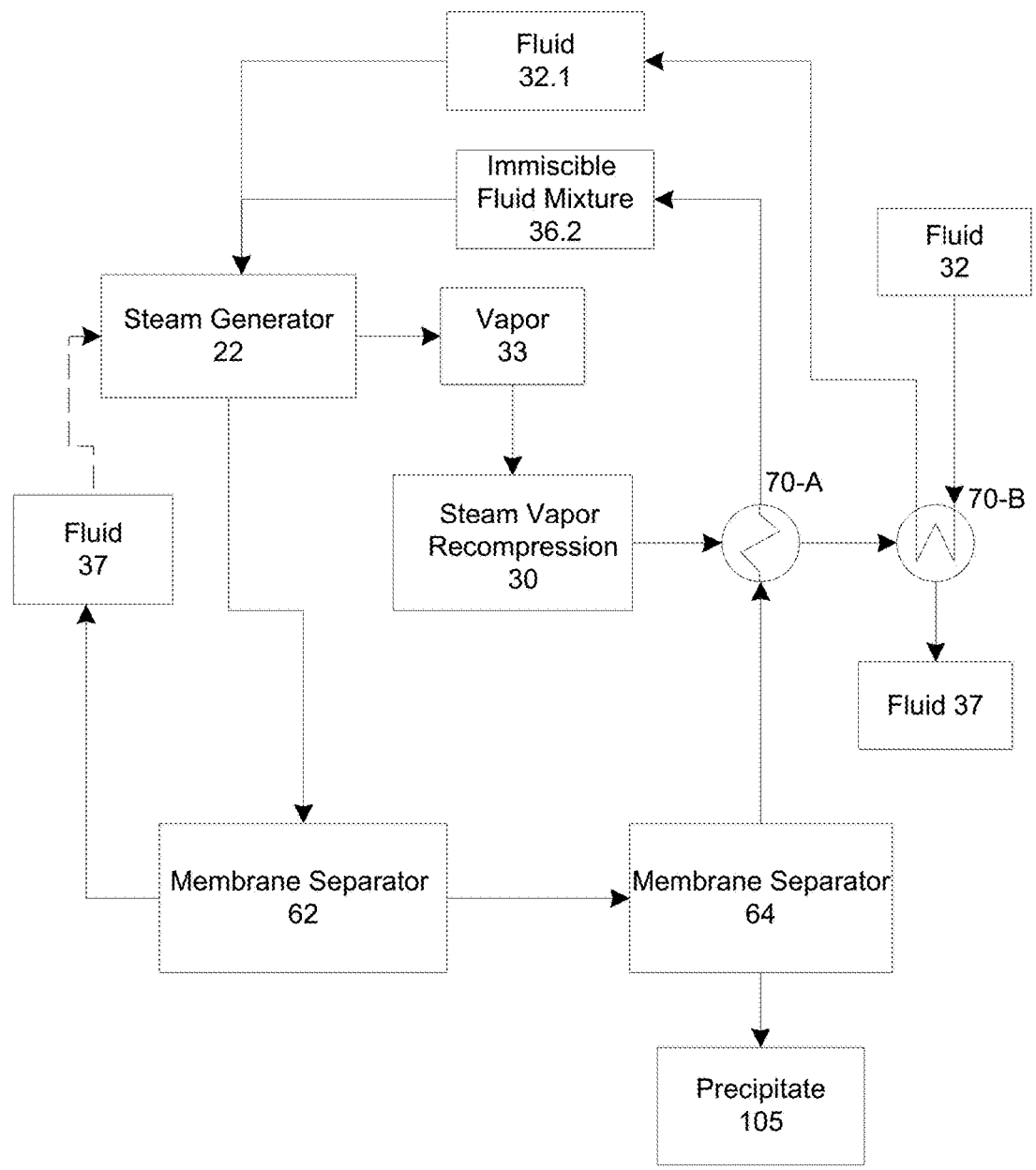
FIG. 13 is a diagram depicting a heat exchangerless system with integral steam recompression and another exemplary configuration of the membranes.

Turning to FIG. 13, FIG. 13 is a diagram depicting a heat exchangerless system with integral steam recompression and another exemplary configuration of the membranes. Fluid 32 is preheated in heat exchanger 70-B to become fluid 32.1. It then mixes with immiscible fluid mixture 36.2, which is made of a mixture of immiscible fluids 31 and 32. The steam generator 22, with optional additional fluid 37, vaporizes some fluid into vapor 33, which then goes through steam vapor recompression 30, which then preheats fluid mixture 36.2 in heat exchanger 70-A and fluid 32 in heat exchanger 70-B, before being condensed into fluid 37, which can be used in any applicable process, either co-located or off-site. The fluid that did not vaporize within steam generator 22, which would include all of fluid 32 and any remaining fluid 31, is completely separated in membrane separator 60.2, where the separated fluid 37 can be used in applicable off-site or co-located cycle or reused in the steam generator 22. The remaining fluid from membrane separator 60.2 is further separated in membrane separator 60.4, separating out any precipitate 105. The remaining fluid mixture 36.2 is preheated in heat exchanger 70-A.

Figure 14:
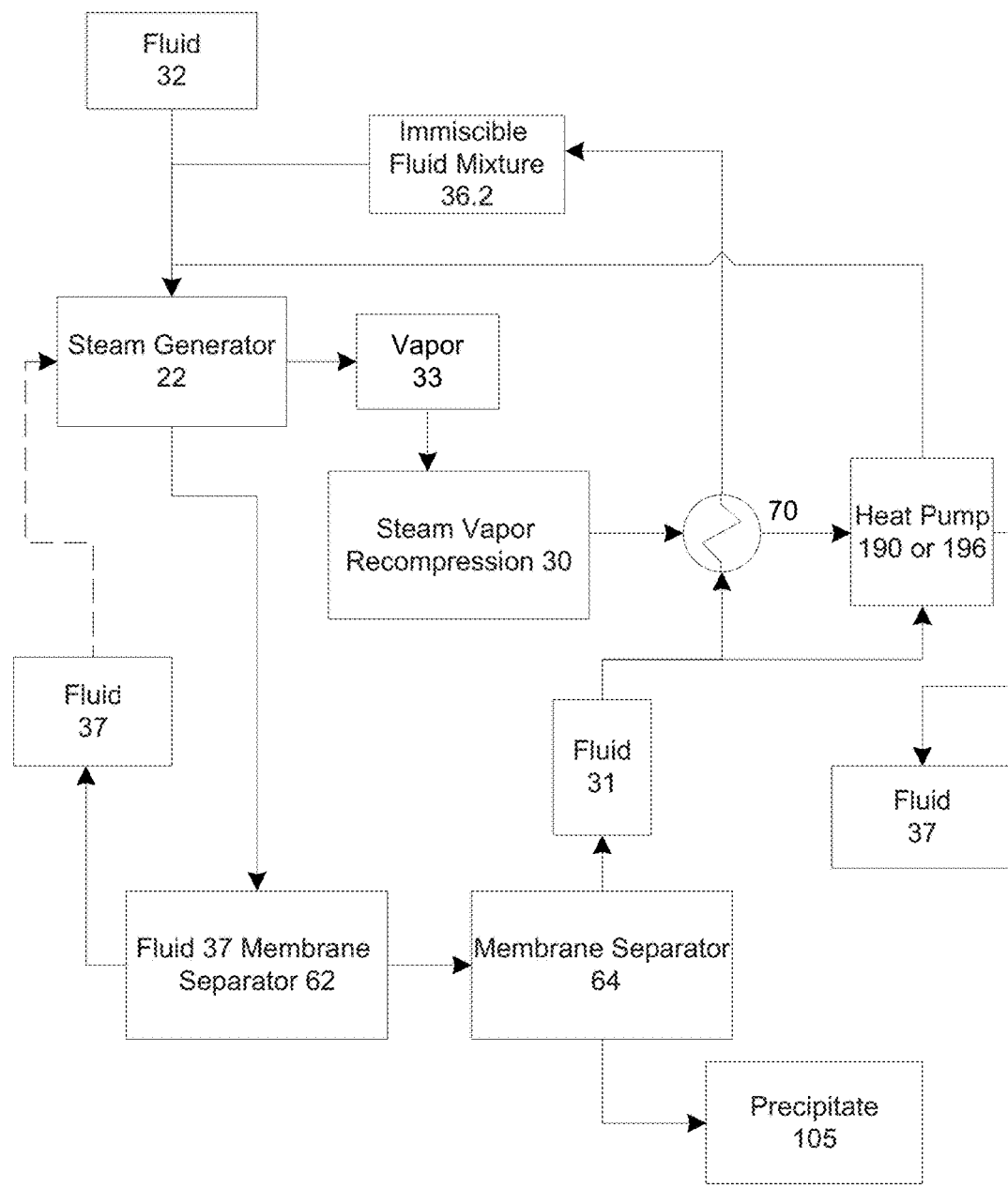
FIG. 14 is a diagram depicting a heat exchangerless system for desalination with integral heat pump energy recovery and steam vapor recompression with a second exemplary configuration of the membranes.

Turning to FIG. 14, FIG. 14 is similar to FIG. 13, except utilizes a heat pump within the heat exchangerless system for desalination with integral energy recovery and steam vapor recompression with a second exemplary configuration of the membranes. Fluid 32 mixes with preheated, immiscible fluid mixture 36.2, which is made of a mixture of immiscible fluids 31 and 32. The steam generator 22, with optional additional fluid 37, vaporizes some fluid into vapor 33, which then goes through steam vapor recompression 30, which then preheats fluid mixture 36.2 in heat exchanger 70 and fluid 36.2 in the heat pump, which could be either vapor compression 190 or absorption 196 type, before being condensed into fluid 37, which can be used in any applicable process, either co-located or off-site. The fluid that did not vaporize within steam generator 22, which would include all of fluid 32 and any remaining fluid 31, is completely separated in membrane separator 60.2, where the separated fluid 37 can be used in applicable off-site or co-located cycle or reused in the steam generator 22. The remaining fluid from membrane separator 60.2 is further separated in membrane separator 60.4, separating out any precipitate 105. The remaining fluid mixture 36.2 is preheated in heat exchanger 70.

Figure 15:
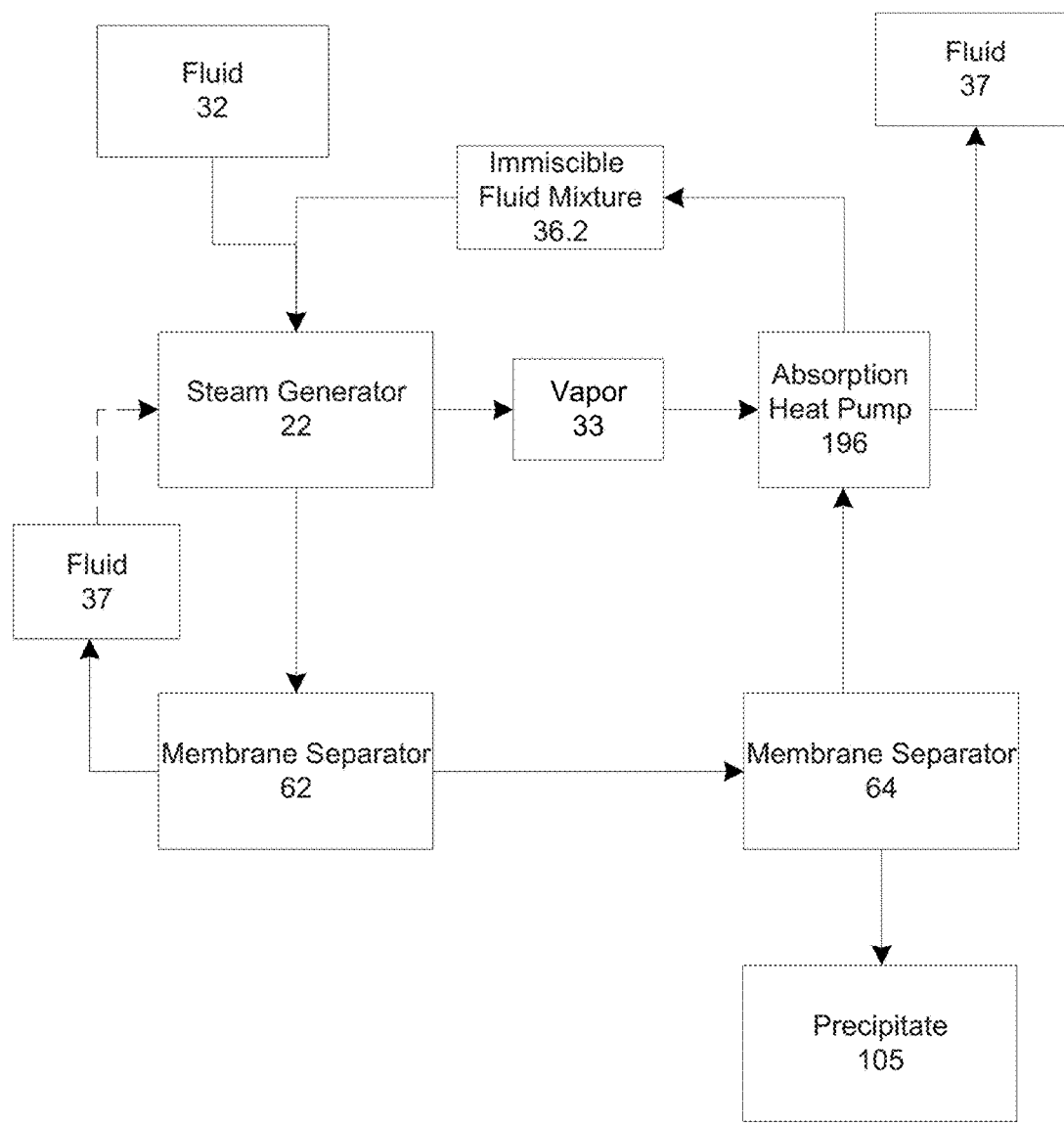
FIG. 15 is a diagram depicting a heat exchangerless system for desalination with integral absorption/adsorption heat pump and an exemplary configuration of the membranes.

Turning to FIG. 15, FIG. 15 is a diagram depicting a heat exchangerless system for desalination with integral absorption/adsorption heat pump and an exemplary configuration of the membranes. It is similar to FIG. 13, but utilizes only an absorption heat pump 196 as its heat recovery cycle. Fluid 32 mixes with preheated, immiscible fluid mixture 36.2, which is made of a mixture of immiscible fluids 31 and 32. The steam generator 22, with optional additional fluid 37, vaporizes some fluid 32 into vapor 33, which then preheats fluid mixture 36.2 in the heat pump, which could be either vapor compression 190 or absorption 196 type, before being condensed into fluid 37, which can be used in any applicable process, either co-located or off-site. The remaining fluid 36.2 from the steam generator 22 is separated in membrane separator 60.2, where fluid 37 can be used in any applicable process, either co-located or off-site. The remaining fluid from membrane separator 60.2 continues to membrane separator 60.4, separating out any precipitate 105. The remaining fluid mixture 36.2 is preheated in heat pump 190 or 196.

Figure 16:
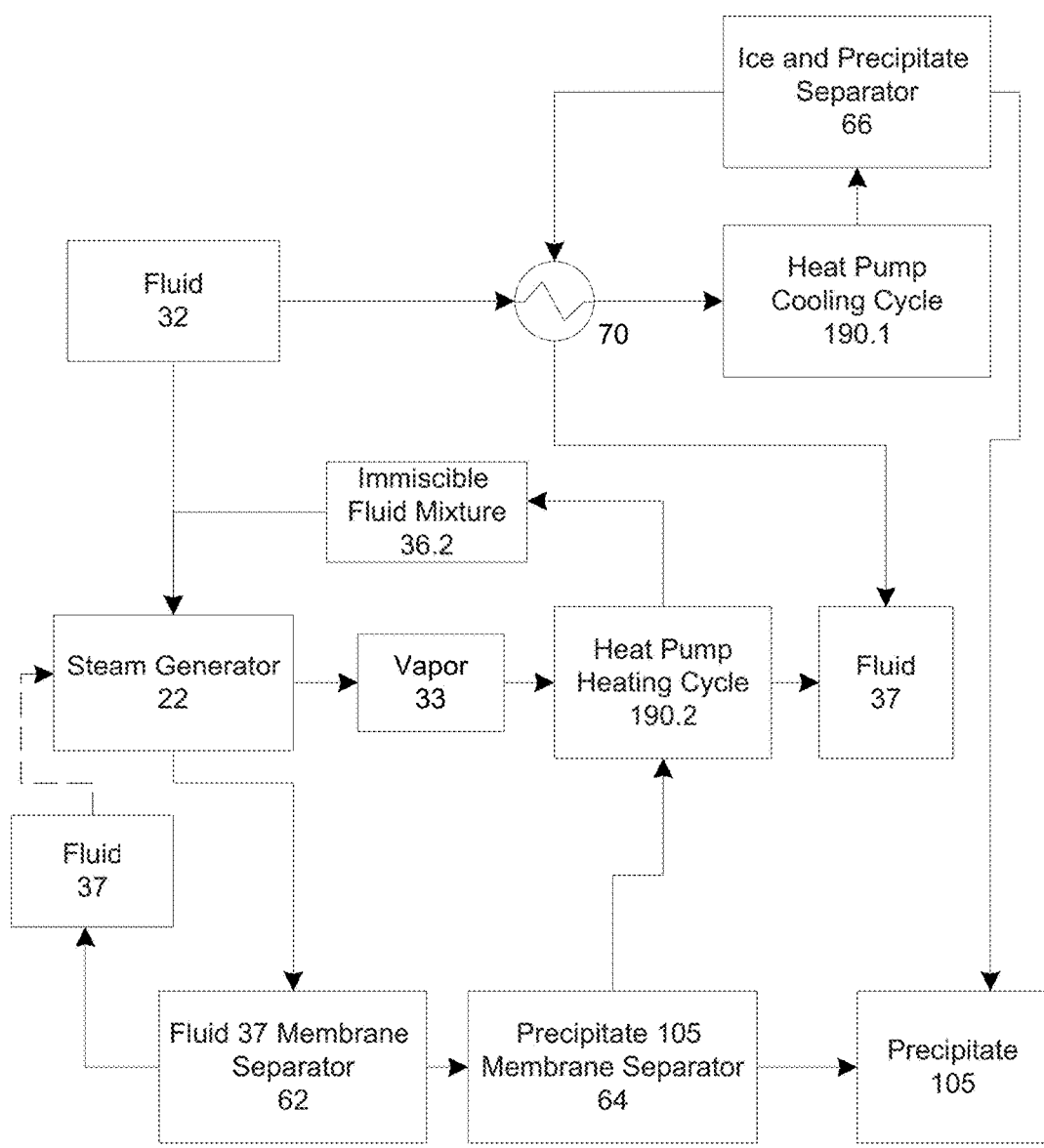
FIG. 16 is a diagram depicting a heat exchangerless system for desalination with integral heat pump having both a heating and cooling circuit, and an exemplary configuration of the membranes.

Turning to FIG. 16, FIG. 16 is similar to FIG. 14 and is a diagram depicting a heat exchangerless system for desalination with integral heat pump having both a heating and cooling circuit, and an exemplary configuration of the membranes. Fluid 32 mixes with preheated, immiscible fluid mixture 36.2, which is made of a mixture of immiscible fluids 31 and 32. The steam generator 22, with optional additional fluid 37, vaporizes some fluid into vapor 33, which preheats fluid mixture 36.2 in the heating cycle of the heat pump 190.2, which could be either vapor compression or absorption type, before being condensed into fluid 37, which can be used in any applicable process, either co-located or off-site. The fluid that did not vaporize within steam generator 22, which would include all of fluid 32 and any remaining fluid 31, is completely separated in membrane separator 60.2, where the separated fluid 37 can be used in applicable off-site or co-located cycle or reused in the steam generator 22. The remaining fluid from membrane separator 60.2 is further separated in membrane separator 60.4, separating out any precipitate 105. The remaining fluid mixture 36.2 is preheated in the heating cycle of the heat pump 190.2.

Concurrently, fluid 32 is precooled in heat exchanger 70 before being cooled in the heat pump cooling cycle 190.1. As the temperature of fluid 32 decreases and begins to form ice, the solid precipitates out and is removed by the ice and precipitate separator 66 and removed to precipitate 105, which can be used in any applicable on- or off-site process as known in the art. The resulting fluid 37 out of the separate 66 precools the incoming fluid 32 in heat exchanger 70, after which it can be used in any applicable on- or off-site process.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A heat exchangerless membrane system comprised of a first fluid having an evaporation temperature; a second fluid having an evaporation temperature wherein the second fluid's evaporation temperature is at least 2 degrees Celsius lower than the first fluid's evaporation temperature; a porous membrane comprising a porous substrate having a surface that is both superhydrophilic, having a first apparent advancing dynamic contact angle of less than or equal to about 5° for second fluid and oleophobic having a second apparent advancing dynamic contact angle of greater than or equal to about 90° for a preselected first fluid; a heat exchanger operable to transfer thermal energy into or out of the first fluid upstream of a heat exchangerless tank, the heat exchangerless tank is operable for heat transfer by direct contact of the first fluid and the second fluid; whereby the porous membrane is operable to separate the first fluid from the second fluid downstream of the heat exchangerless tank; and wherein the first fluid is at least partially immiscible with the second fluid.

2. The heat exchangerless membrane system according to claim 1 further comprised of an emulsifier operable to create an emulsion of first fluid and second fluid and to increase a heat transfer rate between the first fluid and the second fluid within the heat exchangerless tank, whereby the membrane is operable to separate the first fluid from the second fluid downstream of the heat exchangerless tank with fouling of less than 5%.

3. The heat exchangerless membrane system according to claim 1 wherein the system is void of a mixer-settler system downstream of the heat exchangerless tank operable to separate the first fluid from the second fluid.

4. The heat exchangerless membrane system according to claim 1 wherein the system is void of a media bed operable to mix the first fluid with the second fluid within the heat exchangerless tank.

5. The heat exchangerless membrane system according to claim 1 further comprised of a process intensification device operable to increase heat transfer between the first fluid and the second fluid.

6. The heat exchangerless membrane system according to claim 1 wherein the heat exchangerless tank is at least one of a absorber within an absorption or adsorption heat pump, a generator within an absorption or adsorption heat pump, a co-current heat transfer device, a counter-current heat transfer device, a desalination device.

7. The heat exchangerless membrane system according to claim 1 further comprised of at least one of a refrigerant vapor compression heat pump or a second fluid vapor recompression.

8. The heat exchangerless membrane system according to claim 7 wherein the refrigerant vapor compression heat pump transfers thermal energy into the first fluid void of a first fluid phase change.

9. The heat exchangerless membrane system according to claim 1 wherein the second fluid is further comprised of at least one additive, wherein the at least one additive makes the second fluid corrosive, and wherein the second fluid with the at least one additive has direct heat transfer only from the first fluid.

10. A heat exchangerless membrane system comprised of a first fluid having an evaporation temperature; a second fluid having an evaporation temperature wherein the second fluid's evaporation temperature is at least 2 degrees Celsius lower than the first fluid's evaporation temperature; a porous omniphobic or hydrophilic and oleophobic membrane; a heat exchanger operable to transfer thermal energy into or out of the first fluid upstream of a heat exchangerless tank, the heat exchangerless tank is operable for heat transfer by direct contact of the first fluid and the second fluid; whereby the porous membrane is operable to separate the first fluid from the second fluid downstream of the heat exchangerless tank; and wherein the first fluid is at least partially immiscible with the second fluid.

11. The heat exchangerless membrane system according to claim 10 wherein the second fluid is further comprised of at least one additive, wherein the at least one additive makes the second fluid corrosive, and wherein the second fluid with the at least one additive has direct heat transfer only from the first fluid.

12. The heat exchangerless membrane system according to claim 11 wherein the first fluid transfers thermal energy into the second working fluid having the at least one additive within the heat exchangerless tank, wherein the transferring of thermal energy heats up the second fluid with the at least one additive into a pure vapor of the second fluid.

13. The heat exchangerless membrane system according to claim 12 further comprised of a heat recovery heat exchanger to recover thermal energy from the pure vapor of the second fluid operable to preheat the first fluid.

14. The heat exchangerless membrane system according to claim 13 wherein the heat exchangerless tank has an operating temperature, wherein the second fluid has an evaporation temperature for a corresponding evaporation pressure, wherein the system is further comprised of at least one of a refrigerant compression heat pump or a vapor recompression compressor having a heat of compression temperature operable to heat the pure vapor of the second fluid above the second fluid's evaporation temperature by at least 1 degree Celsius, and wherein the heat of compression is transferred to the first fluid by a heat exchanger void of contact with the at least one additive.

15. The heat exchangerless membrane system according to claim 14 wherein the refrigerant compression heat pump has both a heat pump heating cycle and a cooling cycle, wherein the heat pump heating cycle transfers heat into the first fluid and wherein the heat pump cooling cycle removes heat from the second fluid operable to precipitate out of solution the at least one additive from the second fluid.

16. The heat exchangerless membrane system according to claim 10 wherein the porous membrane comprises a porous substrate having a surface that is both superhydrophilic, having a first apparent advancing dynamic contact angle of less than or equal to about 5° for second fluid and oleophobic having a second apparent advancing dynamic contact angle of greater than or equal to about 90° for a preselected first fluid.

17. The heat exchangerless membrane system according to claim 10 further comprised of an emulsifier operable to create an emulsion of first fluid and second fluid and to increase a heat transfer rate between the first fluid and the second fluid within the heat exchangerless tank, whereby the membrane is operable to separate the first fluid from the second fluid downstream of the heat exchangerless tank with fouling of less than 5%.

18. The heat exchangerless membrane system according to claim 10 further comprised of a process intensification device operable to increase heat transfer between the first fluid and the second fluid.

19. The heat exchangerless membrane system according to claim 10 wherein the heat exchangerless tank is at least one of a absorber within an absorption or adsorption heat pump, a generator within an absorption or adsorption heat pump, a co-current heat transfer device, a counter-current heat transfer device, a desalination device.

20. The heat exchangerless membrane system according to claim 10 further comprised of at least one of a refrigerant vapor compression heat pump or a second fluid vapor recompression.

* * * * *